Oct. 2, 1923.  
J. S. BURDICK  
CURTAIN CONSTRUCTION  
Filed Aug. 31, 1920  
1,469,356  
2 Sheets-Sheet 1
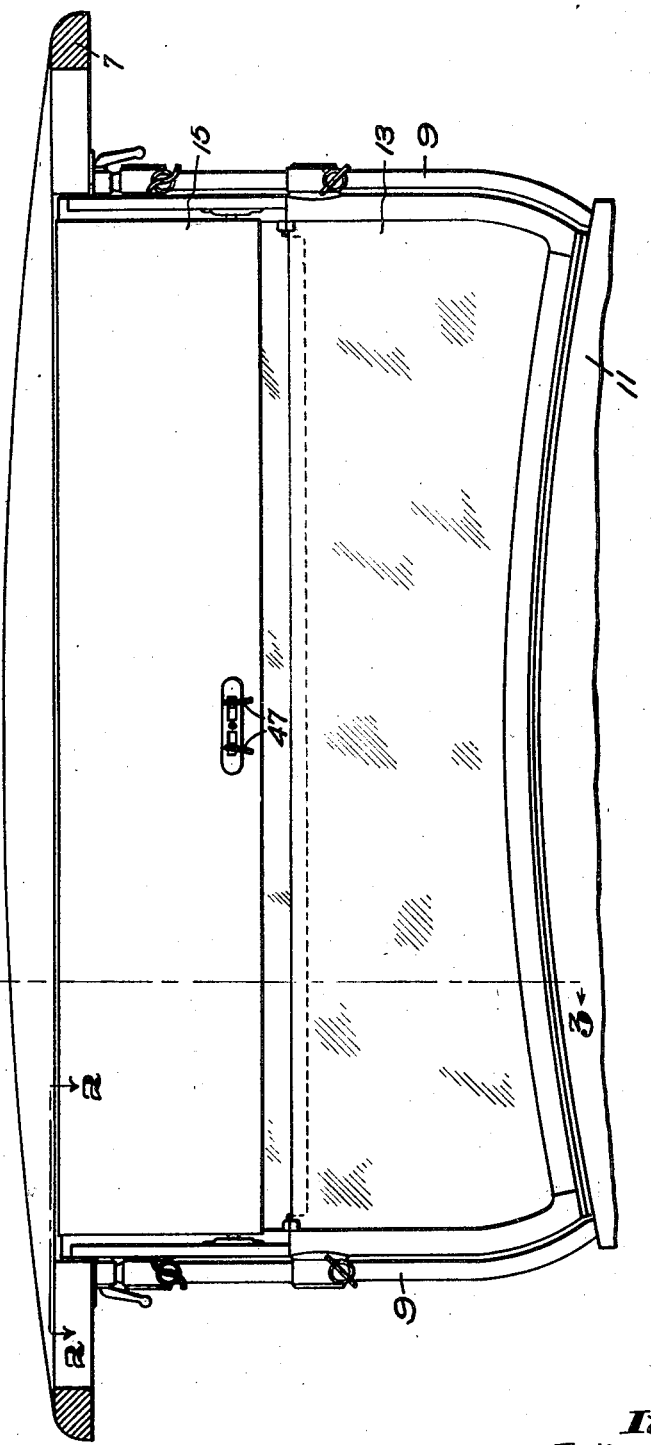
Inventor:
John S. Burdick,
by Emery, Booth, Janney & Varney Attys.

Oct. 2, 1923.
J. S. BURDICK
1,469,356
CURTAIN CONSTRUCTION
Filed Aug. 31, 1920
2 Sheets-Sheet 2
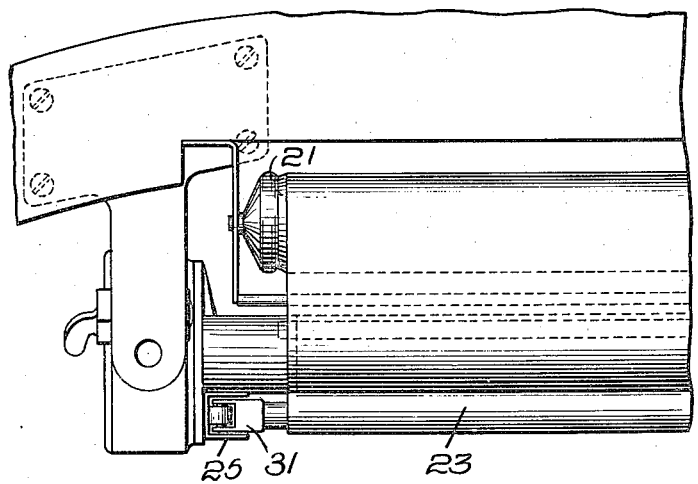
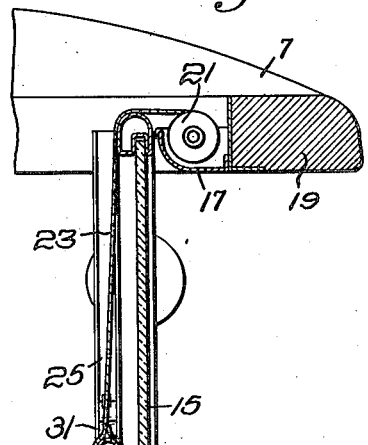
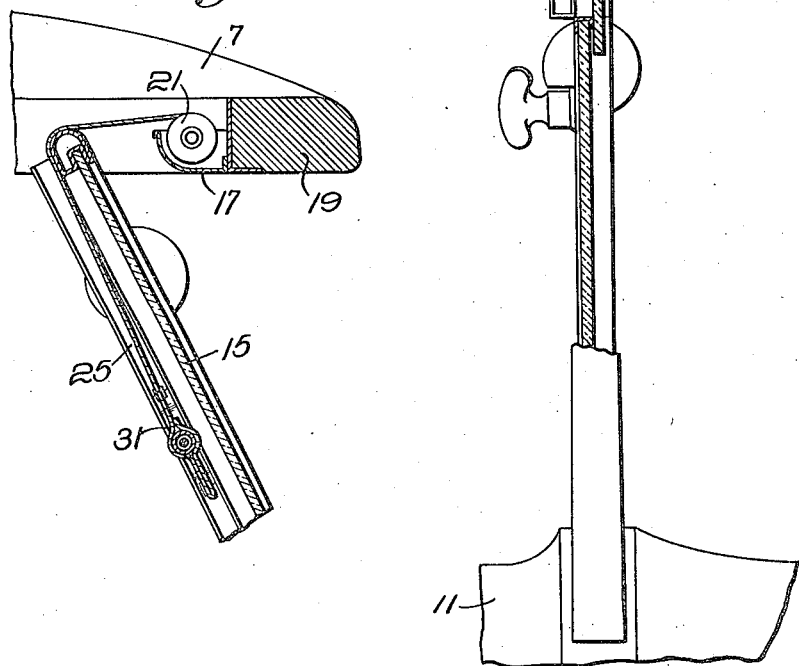
Inventor:
John S. Burdick,
by Emery, Booth, Janney & Varney
Attys Patented Oct. 2, 1923.

1,469,356

UNITED STATES PATENT OFFICE.

JOHN S. BURDICK, OF STRATFORD, CONNECTICUT.

CURTAIN CONSTRUCTION.

Application filed August 31, 1920. Serial No. 407,159.

*To all whom it may concern:*

Be it known that I, JOHN S. BURDICK, a citizen of the United States, and a resident of Stratford, county of Fairfield and State of Connecticut, have invented an Improvement in Curtain Constructions, of which the following description, in connection with the accompanying drawings, is a specification, like characters on the drawings representing like parts.

This invention relates to curtain constructions and in its more specific aspects to an arrangement of curtain adapted to be used on an automobile to provide shade for the occupants and in particular for the driver under certain conditions of light which are dazzling and inconvenient. For example, in the early morning or evening when the sun is low and the rays more or less level, the light will frequently shine into the eyes of an automobile driver in such a way as to seriously discommode him. A further object is to provide a device which will form a weatherproof closure between the top of the automobile and the wind shield in any position of adjustment of the latter.

My invention will be best understood by reference to the following description of an illustrative embodiment thereof shown in the accompanying drawings, wherein Fig. 1 is a section through the top of a covered automobile taken just to the rear of the wind shield and showing the wind shield in elevation;

Fig. 2 is a section on the line 2—2 of Fig. 1;

Fig. 3 is a section on the line 3—3 of Fig. 1;

Fig. 4 is a view similar to Fig. 3 showing the movable section of the wind shield in a different position; and Fig. 5 is a sectional detail of the curtain holder utilized in the construction.

Referring to the drawings, I have illustrated in Fig. 1 the top or roof 7 of a motor car and the wind shield thereof carried by the supports 9 rising from the dash 11 and embodying in the example shown a lower section 13 and an upper section or pane 15 pivoted at an intermediate point on a horizontal axis as is usual. These parts may be of any known or usual construction.

Referring now to Figs. 2 and 3, a suitable curtain adapted to be drawn over the pane 15 of the wind shield may be carried by the top and herein I have shown a trough 17 secured to the forward bar 19 of the top and having journalled horizontally therein the curtain roller 21 of any usual construction and having the ordinary springs automatically to wind up the curtain. As shown in Fig. 2, the curtain 23 may be drawn from the roller over the edge of the trough and down over the face of the pane 15 and suitable means are provided for retaining the curtain in any desired position of adjustment.

In the form of invention here shown the free edge of the curtain is provided with a curtain holder which stiffens the same and which may be of the type shown in Fig. 5, presently to be described. The ends of this device may be received by suitable guides on the pane 15 which herein take the form of channels 25 open at their upper ends and secured to the wind shield along opposite sides thereof.

The curtain holder illustrated in Fig. 5 is not in itself new. As there illustrated it comprises a tube 27 carried by the free end of the curtain in the opposite ends of which are received the rods 29 carrying at their outer ends wheeled trucks 31 adapted to seat in and run along the guide channels 25 as shown. Seated in the ends of the tubes 27 are sockets 41 adapted to receive the coil springs 43 bearing against shoulders 45 carried by rods 29, which springs thus tend to thrust the trucks 31 outwardly into gripping contact with the channels. The inner ends of the rods 29 may have threaded thereto the operating handles 47, best shown in Fig. 1. It will be readily understood that when these handles are pinched together the trucks will be drawn inwardly against the force of the springs, releasing their grip on the channels and the curtain may then be raised or lowered. In any desired position of adjustment release of the handles will permit the trucks to be forced outwardly into gripping engagement with the channels to hold the curtain in its desired position of adjustment.

The wheeled trucks 25 (see Figs. 2 and 3) may be drawn completely from the open ends of the guide channels 25 permitting the curtain holder and curtain to be stowed in the trough 17 when not in use and folded away with the top if a foldable top is used.

The construction described permits the pane 15 to be tilted about its axis in the usual manner as illustrated in Fig. 4.

It will be noted that the structure described is provided with a very slight alteration of the wind shield. The curtain and its roller are normally supported by the strong framework of the top and not on the comparatively fragile wind shield. When the curtain is not in use only the inconspicuous channel guides 25 appear at the sides of the wind shield and the middle portion thereof and the upper and lower edges are in no way obstructed.

It will furthermore be noted that the curtain 23 extends from the edge of the top over the top of the wind shield and thus forms an efficient weather guard to prevent rain from beating in between the top of the car and the top of the wind shield. The upper half of the wind shield can be opened at the bottom as far as desired and at the same time it will have the advantage of a weatherproof top.

Having thus described in detail the particular embodiment of my invention chosen for purposes of illustration, the principles exemplified thereby which I claim as new and desire to secure by Letters Patent I shall express in the following claims:

1. In a vehicle, the combination of a roof, supports therefor, a wind-shield pivoted on said supports to turn about an axis intermediate upper and lower, horizontal edges of said shield, a curtain roller mounted horizontally on said roof forward of said windshield, and a curtain wound on said roller and extending therefrom to a point adjacent the upper horizontal edge of said shield and thence in a downward direction along said shield.

2. In a vehicle, the combination of a roof, a shield pivoted to turn about an axis intermediate opposite horizontal edges of said shield, a curtain roller mounted horizontally on said roof, a curtain wound on said roller, extending rearwardly therefrom across the upper edge of said shield and downwardly along the rear face of the latter, and means adjustably to secure said curtain to said shield at different points in its height.

3. In a vehicle, the combination of a body presenting a transverse bar, a curtain roller mounted horizontally on said body behind said bar, a shield pivoted to turn about a horizontal axis intermediate upper and lower horizontal edges of said shield, a curtain wound on said roller and leading therefrom rearwardly to the upper edge of said shield and thence in a downward direction behind said shield, and means adjustably to secure said curtain to said shield at different distances from said axis.

In testimony whereof, I have signed my name to this specification.

JOHN S. BURDICK.